United States Patent
Maxwell

(10) Patent No.: US 6,315,897 B1
(45) Date of Patent: Nov. 13, 2001

(54) RAIN WATER RUN-OFF FILTERING SYSTEM

(75) Inventor: Kevin Maxwell, Midlothian, VA (US)

(73) Assignee: Eastern States Associates, Midlothian, VA (US)

( * ) Notice: Subject to any disclaimer, the term of this patent is extended or adjusted under 35 U.S.C. 154(b) by 0 days.

(21) Appl. No.: 09/577,372

(22) Filed: May 23, 2000

(51) Int. Cl.[7] .................................................. B01D 24/22
(52) U.S. Cl. .......................... 210/170; 210/254; 210/283; 210/289; 210/293
(58) Field of Search .................................. 210/170, 254, 210/257.1, 283, 289, 290, 293

(56) References Cited

U.S. PATENT DOCUMENTS

| | | | |
|---|---|---|---|
| 3,925,202 | * 12/1975 | Hirs | 210/293 |
| 3,962,084 | 6/1976 | Nussbaum . | |
| 4,094,789 | * 6/1978 | Kemper | 210/289 |
| 4,783,272 | 11/1988 | Patterson . | |
| 4,925,552 | * 5/1990 | Bateson et al. | 210/293 |
| 4,985,148 | 1/1991 | Monteith . | |
| 5,017,044 | 5/1991 | Sharp . | |
| 5,073,261 | 12/1991 | Conradi et al. . | |
| 5,204,000 | 4/1993 | Steadman et al. . | |
| 5,322,629 | * 6/1994 | Stewart | 210/170 |
| 5,330,651 | 7/1994 | Robertson et al. . | |
| 5,433,845 | * 7/1995 | Greene et al. | 210/170 |
| 5,498,331 | * 3/1996 | Monteith | 210/170 |
| 5,500,132 | 3/1996 | Elmi . | |
| 5,503,747 | 4/1996 | Vion et al. . | |
| 5,746,911 | * 5/1998 | Pank | 210/254 |
| 6,077,448 | * 6/2000 | Tran-Quoc-Nam et al. | 210/254 |

* cited by examiner

Primary Examiner—Christopher Upton
(74) Attorney, Agent, or Firm—Shoemaker and Mattare

(57) ABSTRACT

A rain water run-off filtering system includes a tank for holding and filtering run-off water, said tank being generally cylindrical with a horizontal axis, and having at least one manway for the introduction of water and a filter media. A horizontal grate disposed at the bottom of the tank, supports a bed of gravel and sand, and incoming water is directed onto the sand bed, thence percolating through the sand to a space below the grate. The outflow of water from the tank is regulated by a baffle plate bounding the sand bed. This plate has small holes for normally producing a small outflow, and at least one large aperture for permitting water to flow through the tank, without percolating through the sand, during extremely heavy rains.

6 Claims, 4 Drawing Sheets

RAIN WATER RUN-OFF FILTERING SYSTEM

BACKGROUND OF THE INVENTION

This invention relates to the art of water purification and more particularly to a filtering system for treating rain water run-off.

The Chesapeake Bay is in crisis because of pollutants from a variety of sources. A major contributor to bay pollution is rain water which runs off of large buildings roofs and parking lots during a storm. Heavy rains rinse these surfaces of accumulated contaminants, flushing them quickly into the bay through storm sewers designed to handle heavy flow rates.

Riparian owners downstream of commercial developments note increased stream volume and flooding during storms. Such areas are designed to shed water, rather than permitting it to soak into the ground where it falls. The effect is the antithesis of a pond system, which catches moderate runoff and allows it to soak into the ground without flooding nearby streams.

It would be beneficial to riparian owners, and, we believe, to the environmental health of the bay, to simulate a pond system in highly developed areas where open ponds are impractical.

Prior inventors have developed a number of water treatment tanks, for example oil-water separators, many containing an aggregate for coalescing oil, or other purpose. This invention is not aimed so much at oil separation as flow control and phosphorus removal. Nevertheless, patents such as U.S. Pat. Nos. 3,962,084, 4,783,272, 4,985,148, 5,017,044, 5,073,261, 5,204,000, 5,330,651, 5,50,132 and 5,503,747 are of interest.

SUMMARY OF THE INVENTION

An object of the invention is to accumulate water during heavy rains, and release it slowly, to reduce peak run-off volume.

Another object of the invention is to reduce pollutant levels in rain water run-off.

A further object of the invention is to provide a simulated pond with the ability to handle unusually heavy flow volumes.

These and other objects are attained by a rain water run-off filtering system comprising one or more large-volume tanks installed below ground at a shopping center or the like, for receiving run-off from building roofs, parking lots and the like during storms, and releasing the water accumulated to a storm sewer system over time.

BRIEF DESCRIPTION OF THE DRAWINGS

In the accompanying drawings.

DESCRIPTION OF THE PREFERRED EMBODIMENT

Figure 1:
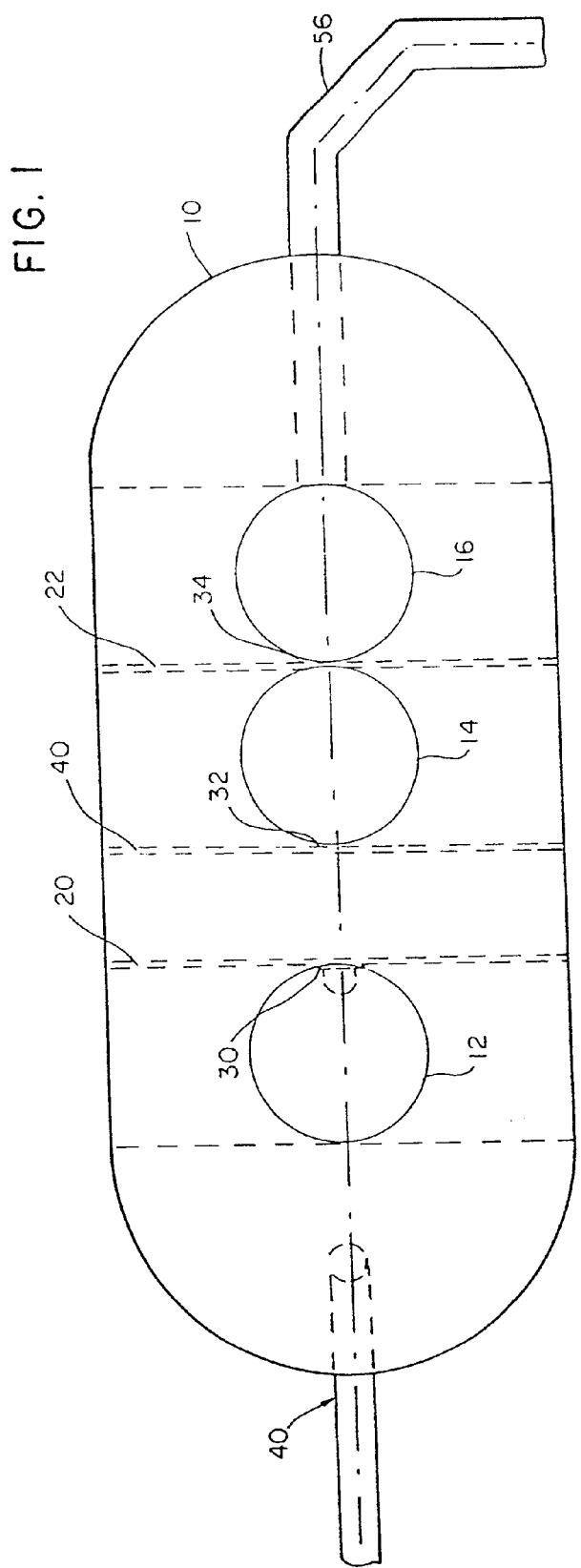
FIG. 1 is a top (plan) view of a rain water run-off filtering system embodying the invention.
Figure 2:
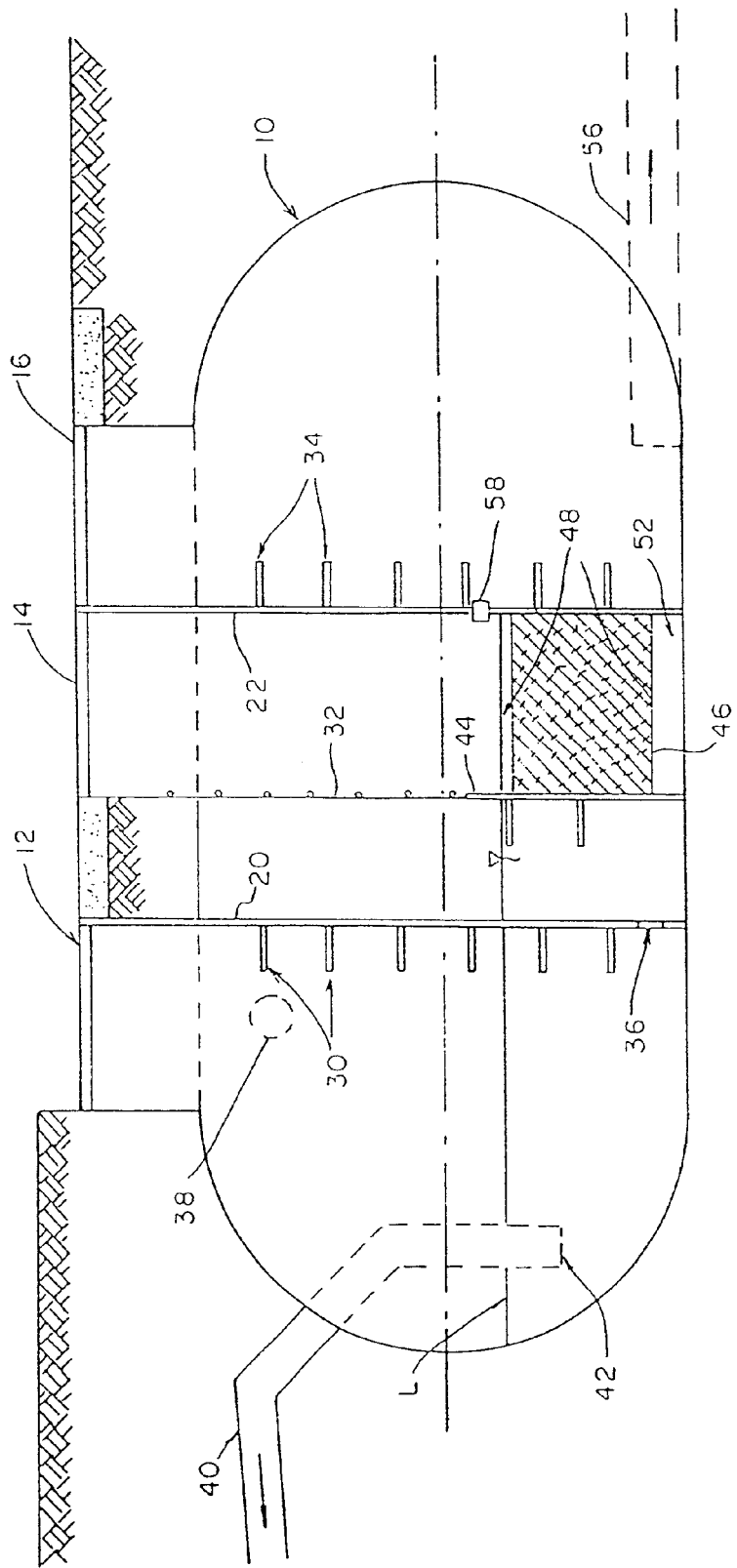
FIG. 2 is a sectional front view thereof, taken on the plane 2—2 in FIG. 1.
Figure 3:
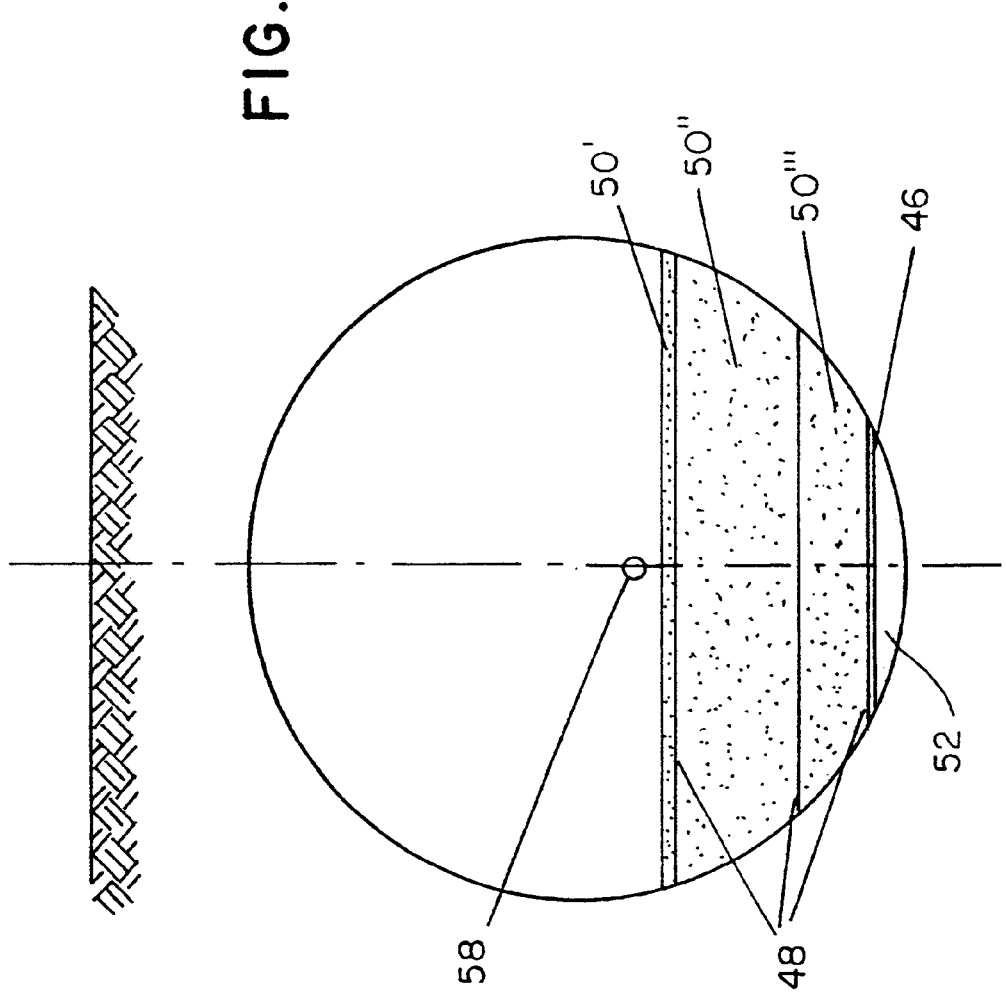
FIG. 3 is a transverse sectional view, taken on the vertical plane 3—3 in FIG. 2.

A rain water run-off filtering system embodying the invention is illustrated in FIGS. 1–4. The system, which for example may be installed under a parking lot adjacent a building, includes at least one holding tank 10 having at its top three manways 12,14,16, each covered by a grate or lid 18. The tank has a large volume (e.g., 6000 gallons), and is made of a strong non-corrosive material such as reinforced fiberglass. Suitable methods of making tanks from such materials are well known.

The tank is divided into three chambers by two partitions or walls 20, 22. The leftmost chamber 24 is the referred to as the inlet chamber. Numeral 26 denotes the central chamber and numeral 28 denotes the outlet chamber.

The manways are provided with ladders or steps 30, 32, 34. The inlet chamber 24 is entirely separated from the rest of the tank by the left partition 20. There is a single six-inch diameter orifice 36 in this partition, near the bottom of the tank. Run-off water enters the inlet chamber through an eight-inch PVC inlet pipe 38 at the top of the chamber, normally filling it to the level indicated by the broken line L. An overflow pipe 40 is provided to permit excess water an escape when the flow rate exceeds the capacity of the filter discussed below. The inlet of the overflow pipe is covered by a metal grating 42.

A weir 44 is situated across the bottom of the central chamber, extending to a height of about three feet (slightly less than half the tank diameter), about two feet to the right of the left partition. The right partition 14 is three feet further to the right.

Within the central chamber, a filter bed is supported to the right of the weir by a horizontal grate 46 made of rigid fiberglass mesh. The grate is covered with a piece of fabric 48 upon which filter aggregate is applied to a depth of about thirty inches. The aggregate preferably is gravel and sand in three layers 50', 50", 50''' separated from one another by pieces of nonwoven textile fabric having high puncture and burst resistance. The preferred layering scheme is a ten inch bottom layer of stone having a diameter of 0.5 to 2 inches, then an eighteen inch layer of sand, and at the top a two inch layer of 0.5 to 2 inch diameter stone. The stone layers should meet Virginia Department of Transportation ("VDOT") stone specification No. 57. The sand should be ASTM C33 concrete sand of VDOT section 202 Grade A fine aggregate, or its equivalent.

Figure 4:
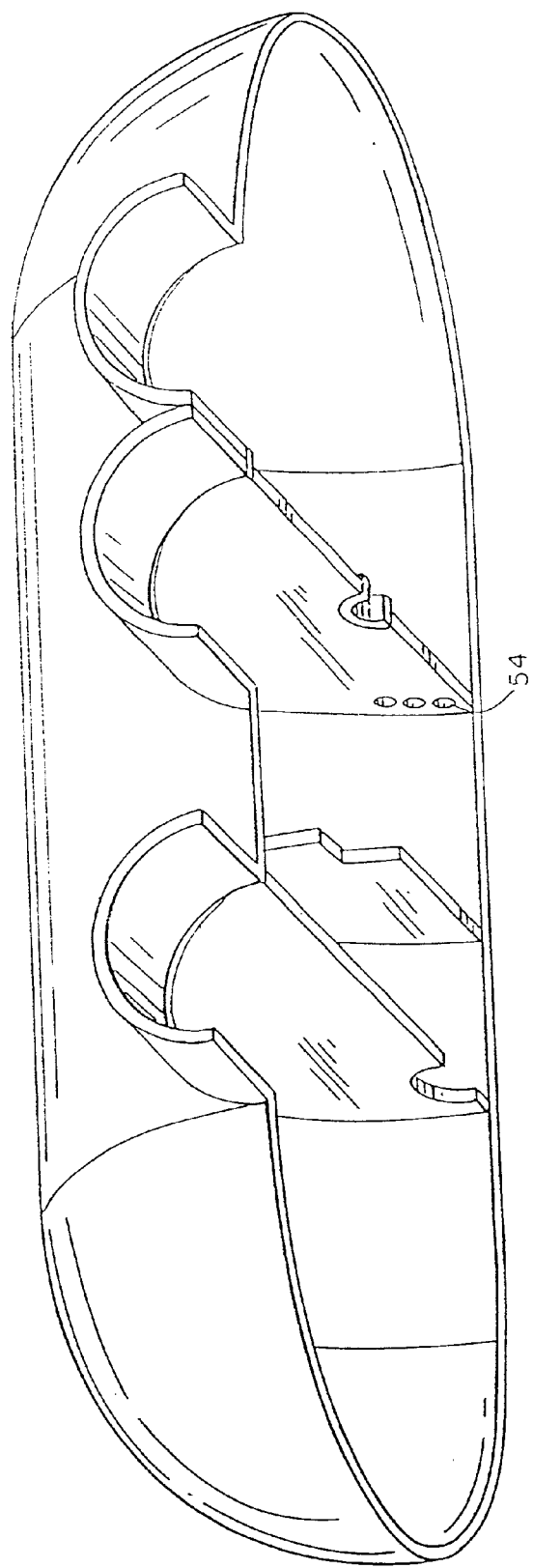
FIG. 4 is an isometric sectional view of the system.

The small volume 52 below the horizontal grate is an open channel through which water exits once is has percolated through the sand. Holes 54 in the outlet chamber partition, seen in FIG. 4, are the normal means of escape for water in the channel.

In normal operation, all the water entering the inlet chamber exits through the orifice in the left partition, then up over the weir, and down through the filter. Filtered water enters the right chamber, and drains out to a storm sewer through the outlet pipe 56.

A dewatering drain 58, having a gate valve (not shown), is installed in the right partition just above the filter, to provide means for water to bypass the filter during very heavy rains. It is important that bypass flow be permitted; otherwise sedimentary materials and pollutants previously retained by the sand could be washed out of the filter bed.

The materials and dimensions specified above are those presently preferred. Changes in dimensions, materials and proportions will occur to those of ordinary skill in the field of the invention.

Since the invention is subject to modifications and variations, it is intended that the foregoing description and the accompanying drawings shall be interpreted as only illustrative of the invention defined by the following claims.

I claim:

1. A rain water run-off filtering system comprising a tank for holding and filtering run-off water, said tank being generally cylindrical with a horizontal axis, a pair of vertical partitions defining inlet, outlet and filter chambers within the tank, a weir plate disposed within the filter chamber, and a filter extending between the weir plate and the partition defining the outlet chamber, said filter comprising a horizontal grate disposed near the bottom of the tank for supporting a bed of aggregate, said weir directing incoming water over the aggregate bed, whereby water percolates through the aggregate to a space below the grate, thence to an outlet pipe in communication with said space.

2. The invention of claim 1, further comprising at least one aperture in the outlet chamber partition, above the top of the filter bed, for permitting water to bypass the filter bed during extremely heavy rains.

3. The invention of claim 1, wherein the filter bed comprises alternating layers of fine and coarse aggregate.

4. The invention of claim 3, further comprising pieces of fabric between said layers.

5. The invention of claim 1, further comprising a piece of fabric between said grate and said aggregate.

6. The invention of claim 1, further comprising an overflow pipe extending through said tank and having one end terminating within the inlet chamber at a level below a top edge of said weir.

* * * * *